United States Patent
Syrjärinne et al.

(10) Patent No.: US 10,545,218 B2
(45) Date of Patent: Jan. 28, 2020

(54) OBTAINING RADIOMAPS

(71) Applicant: HERE GLOBAL B.V., Eindhoven (NL)

(72) Inventors: Jari Syrjärinne, Tampere (FI); Pavel Ivanov, Tampere (FI); Muhammad Irshan Khan, Tampere (FI)

(73) Assignee: HERE Global B.V., Eindhoven (NL)

( * ) Notice: Subject to any disclaimer, the term of this patent is extended or adjusted under 35 U.S.C. 154(b) by 270 days.

(21) Appl. No.: 15/326,978

(22) PCT Filed: Jul. 18, 2014

(86) PCT No.: PCT/EP2014/065508
§ 371 (c)(1),
(2) Date: Jan. 17, 2017

(87) PCT Pub. No.: WO2016/008540
PCT Pub. Date: Jan. 21, 2016

(65) Prior Publication Data
US 2017/0205491 A1 Jul. 20, 2017

(51) Int. Cl.
*H04W 64/00* (2009.01)
*G01S 5/02* (2010.01)

(52) U.S. Cl.
CPC .................. *G01S 5/0257* (2013.01)

(58) Field of Classification Search
CPC .............................. H04W 64/00; G06N 7/005
USPC .......... 455/456.1; 706/52; 340/995.1, 995.14
See application file for complete search history.

(56) References Cited

U.S. PATENT DOCUMENTS

| | | | | |
|---|---|---|---|---|
| 6,487,305 | B2* | 11/2002 | Kambe | G01C 21/20 340/995.1 |
| 6,714,664 | B2* | 3/2004 | Kambe | G01C 21/20 340/995.14 |
| 7,894,412 | B2 | 2/2011 | Hart et al. | |
| 8,169,300 | B2 | 5/2012 | Pandey | |
| 8,385,943 | B1 | 2/2013 | Han et al. | |
| 9,304,970 | B2* | 4/2016 | Wirola | G01S 5/0252 |
| 9,641,814 | B2* | 5/2017 | Wirola | G01S 5/0263 |
| 9,955,309 | B2* | 4/2018 | Wirola | H04W 64/00 |
| 10,049,455 | B2* | 8/2018 | Wirola | G01C 21/20 |
| 2007/0001904 | A1 | 1/2007 | Mendelson | |
| 2011/0176523 | A1 | 7/2011 | Huang et al. | |
| 2012/0089554 | A1* | 4/2012 | Claxton | G06N 7/005 706/52 |

(Continued)

FOREIGN PATENT DOCUMENTS

WO WO-2013/065042 A1 5/2013
WO WO 2013/070170 A1 5/2013

OTHER PUBLICATIONS

Shin, Hyojeong et al. "Wi-Fi Fingerprint-Based Topological Map Building for Indoor User Tracking." 2010 IEEE 16th International Conference on Embedded and Real-Time Computing Systems and Applications (RTCSA), IEEE, Piscataway, NJ, USA, Aug. 23, 2010, pp. 105-113.

(Continued)

*Primary Examiner* — William D Cumming
(74) *Attorney, Agent, or Firm* — Alston & Bird LLP

(57) ABSTRACT

It is disclosed to obtain physical layout data of a radiomap based on a plurality of location information representatives, each of the location information representatives being associated with a radiomeasurement.

21 Claims, 6 Drawing Sheets

(56) References Cited

U.S. PATENT DOCUMENTS

| | | | |
|---|---|---|---|
| 2013/0035109 A1 | 2/2013 | Tsruya et al. | |
| 2013/0116968 A1* | 5/2013 | Wirola | G01S 5/0252 702/150 |
| 2013/0166195 A1 | 6/2013 | Bandyopadhyay et al. | |
| 2013/0178226 A1 | 7/2013 | Ye et al. | |
| 2013/0195314 A1* | 8/2013 | Wirola | G01C 21/20 382/103 |
| 2013/0201365 A1* | 8/2013 | Wirola | G01S 5/0263 348/231.3 |
| 2014/0194143 A1 | 7/2014 | Krainz | |
| 2014/0324381 A1* | 10/2014 | Venkatrannan | G01C 21/00 702/138 |
| 2014/0335894 A1* | 11/2014 | Wirola | H04W 64/00 455/456.1 |
| 2016/0161592 A1 | 6/2016 | Wirola et al. | |
| 2017/0205491 A1* | 7/2017 | Syrjarinne | G01S 5/0257 |
| 2018/0107355 A1* | 4/2018 | Khan | G06F 3/0484 |

OTHER PUBLICATIONS

Hussin, Zulfazli. "Fast-Converging Indoor Mapping for Wireless Indoor Localization." 2014 IEEE International Conference on Pervasive Computing and Communication Workshops (Percom Workshops), IEEE, Mar. 24, 2014, pp. 171-173.

International Search Report and Written Opinion of International Searching Authority for International Patent Application No. PCT/EP2014/065508 dated Mar. 23, 2015, 8 pages.

International Preliminary Report on Patentability, Chapter I, for International Patent Application No. PCT/EP2014/065508 dated Jan. 24, 2017, 7 pages.

Wang, H. et al., *Enhancing the Map Usage for indoor Location-Aware Systems*, Jacko J. A., (eds) Human-Computer Interaction, Interaction Platforms and Techniques, HCI 2007, Lecture Notes in Computer Science, vol. 4551, Springer (2007) 10 pages.

Office Action for European Application No. 14 741 605.1 dated Aug. 5, 2019, 4 pages.

* cited by examiner

OBTAINING RADIOMAPS

FIELD OF THE DISCLOSURE

The invention relates to the field of obtaining radiomaps.

BACKGROUND

Indoor positioning requires novel systems and solutions that are specifically developed and deployed for this purpose. The "traditional" positioning technologies which are used mainly outdoors, i.e. satellite and cellular positioning technologies, cannot deliver such a performance indoors that would enable seamless and equal navigation experience in both environments. The required positioning accuracy (2-3 m), coverage (~100%) and floor detection are challenging to achieve with satisfactory performance levels with the systems and signals that were not designed and specified for the indoor use cases in the first place. Satellite-based radio navigation signals simply do not penetrate through the walls and roofs strongly enough for the adequate signal reception and the cellular signals have too narrow bands for accurate ranging by default.

Several indoor-dedicated solutions have already been developed and commercially deployed during the past years e.g. solutions based on pseudolites (GPS-like short-range beacons), ultrasound positioning, BTLE signals (e.g. Nokia High-Accuracy Indoor Positioning, HAIP) and WiFi fingerprinting (Ekahau, Polestar). What is typical to these solutions is that they require either deployment of totally new infrastructure (beacons, tags and so on) or manual exhaustive radiosurveying of the buildings including all the floors, spaces and rooms. This is rather expensive and will take a considerable amount of time to build the coverage to the commercially expected level, which in some cases narrowed the potential market segment only to very thin customer base e.g. for health care or dedicated enterprise solutions. Also, the diversity of these technologies makes it difficult to build a globally scalable indoor positioning solution, and the integration and testing will become complex if a large number of technologies is needed to be supported in the consumer devices, such as smartphones.

For an indoor positioning solution to be commercially successful, that is, 1) being globally scalable, 2) having low maintenance and deployment costs, and 3) offering acceptable end-user experience, the solution needs to be based on an existing infrastructure in the buildings and on existing capabilities in the consumer devices.

This leads to an evident conclusion that the indoor positioning needs to be based on WiFi- and/or Bluetooth (BT)-technologies that are already supported in the every smartphone, tablet, laptop and even in the majority of the feature phones. It is now needed to find a solution that uses the WiFi- and BT-radiosignals in such a way that makes it possible to achieve 2-3 m horizontal positioning accuracy, close to 100% floor detection with the ability to quickly build the global coverage for this approach.

However, the radiomaps used for positioning need to be currently surveyed manually, which is blocking rapid global scalability. FIG. 1 depicts an example of such a manually surveyed of a radiomap, i.e. the information regarding the layout of the different floors of the building in this example must be known in order to place the radiomeasurements (indicated by stars) in the radiomap.

SUMMARY OF SOME EXAMPLE EMBODIMENTS OF THE INVENTION

According to an aspect of the present invention, a method performed by an apparatus is disclosed, the method comprising obtaining physical layout data of a radiomap based on a plurality of location information representatives, wherein at least one of the location information representatives is associated with a radiomeasurement.

For each aspect of the invention, further a first apparatus is disclosed, which is configured to realize or comprises respective means for realizing the actions of the method according to an aspect of the invention (and any of its embodiments described herein). The means of this apparatus can be implemented in hardware and/or software. They may comprise for instance a processor, e.g. for executing computer program code for realizing the required functions, a memory storing the program code, or both. Alternatively, they could comprise for instance circuitry that is designed to realize the required functions, for instance implemented in a chipset or a chip, like an integrated circuit.

For each aspect of the invention, further a second apparatus is disclosed, which comprises at least one processor and at least one memory including computer program code, the at least one memory and the computer program code configured to, with the at least one processor, cause an apparatus at least to perform the actions of the method according to the first and/or second aspect of the invention (and any of its embodiments described herein). The apparatus may comprise only the indicated components or one or more additional components. It may be a module or a component for a device, for example a chip. Alternatively, it may be a device, for instance a server or a mobile terminal. Any of the described apparatuses may for instance at least comprise a user interface, a communication interface and/or an antenna.

For each aspect of the invention, further a non-transitory (e.g. tangible) computer readable storage medium is described, in which computer program code is stored, which causes an apparatus to realize the actions of the method according to the first and/or second aspect of the invention (and any of its embodiments described herein) when executed by a processor. The computer readable storage medium could for example be a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that also the computer program code by itself has to be considered an embodiment of the invention.

Any of the described apparatuses may comprise only the indicated components or one or more additional components. Any of the described apparatuses may be a module or a component for a device, for example a chip. Alternatively, any of the described apparatuses may be a device, for instance a server or a mobile terminal, or form part thereof. Examples of such mobile terminals include mobile phones, personal digital assistants (PDAs), mobile computers, e.g. laptops, notebooks or tablet computers, digital music players etc. Any of the described apparatuses may for instance at least comprise a user interface, a communication interface and/or an antenna.

In the following, some explanations of embodiments of the invention are given. For reasons of conciseness, focus is put on the method according to the aspect of the invention. The given explanations however correspondingly apply to the first apparatus, the second apparatus, the non-transitory computer readable storage medium and the computer program code according to an aspect of the invention.

It is to be understood that the presentation of embodiments of the invention in this section is merely exemplary and non-limiting.

For instance, a location information representative may be indicative of an estimated geoposition of a mobile terminal. The plurality of location information representatives may be obtained from or based on one or more mobile terminals in an environment, e.g., when moving through the environment and/or when collecting radiomeasurements. As an example, a plurality of mobile terminals may be used for obtaining the plurality of location information representatives, wherein each of the plurality of mobile terminals may provide at least one location information representative or data which can be used to obtain one or more location information representatives of the plurality of location information representatives. Furthermore, each of said provided location information representative or data which can be used to obtain a location information representative can be associated with a radiomeasurement collected by the respective mobile terminal. For instance, a server may receive those location information representatives and/or the data which can be used to obtain one or more location information representatives and the radiomeasurement from the mobile terminals. Furthermore, the server may be configured to obtain a location information representative based on the data which can be used to obtain a location information representative.

As an example, a location information representative may be indicative of a position in a two-dimensional or three-dimensional coordinate system. For instance, the radio map may comprise discrete coordinates of a discrete coordinate grid or consist of such coordinates, wherein a location information may be indicative of a position in this coordinate grid.

One or more of the location information representatives may for instance have been obtained by means of or based on an positioning interface, e.g. a global navigation satellite system (GNSS) interface or another well-suited interface of the respective mobile terminal. The location information representative may specify the location at which a radio measurement value has been measured. If no positioning interface measurement is possible, e.g. in an indoor environment, the location information representative of a mobile terminal may be obtained based on an absolute geolocation representative and at least one relative geolocation representative.

At least one of the plurality of location information representatives is associated with a radiomeasurement. Thus, a location information representative may be indicative of a location where the respective mobile terminal performed a radiomeasurement. The location information representative or data which can be used to obtain the location information representative may for instance have been reported by the mobile terminal to the server together with the radio measurement values. As an example, crowd-sourced radiomeasurements from a plurality of mobile terminals may be transmitted to the server, wherein a radiomeasurement may be transmitted together with a location information representative or data which can be used to obtain the location information representative. Such a radiomeasurement and a location information representative or data which can be used to obtain the location information representative may be considered as a "fingerprint" which is collected by the respective mobile terminal. Thus, a plurality of fingerprints may be collected by different mobile terminals and may be transmitted to the server. The estimation of location which serves as basis for a respective location information may be determined at the server or at a mobile terminal.

The radio measurement values may for instance contain a received signal strength (RSS), e.g. measured in dBm, for instance with a reference value of 1 mW, with or without the Doppler effect being averaged out therein, and/or pathlosses and/or timing measurement values like timing advance (TA), round-trip time (RTT) and/or propagation delay, and/or an angle of arrival (AOA). Boolean radio measurement values are also possible, e.g. a radio measurement value that indicates whether or not a specific location lies within the coverage area of a specific communication network node.

Physical layout data is obtained based on a plurality of location information representatives, wherein said obtained physical layout data may be associated with an environment and may be used to generate or update or amend or extend a radiomap. This environment may represent an outdoor environment or an indoor environment.

For instance, said physical layout data may comprise information being descriptive of an area, a portion of a building, a building, a portion of a floor, a floor, a portion of a room, a room or a group of rooms. Said information being descriptive of a portion of a building, portion of a floor or portion of a room may comprise location information of at least one building wall, and/or location information of at least one door or at least one stair. Said information being descriptive of a building, floor or room may comprise information about the form or size of the building, floor or room. Furthermore, said physical layout data may comprise position information of an area, a portion of a building, a building, a portion of a floor, a floor, a portion of a room, a room or a group of rooms. For instance, said position information may comprise information two-dimensional or three-dimensional location information.

Inherent information about an area, a portion of a building, a building, a portion of a floor, a floor, a portion of a room, a room or a group of rooms or any other physical layout (e.g. physical constraints) in the plurality of location information representatives can be used to obtain said physical layout data. This may be performed by analyzing said plurality of location information representatives by clearly distinguishable features (e.g. altitude) that may allow clustering of the data.

Thus, physical layout data for a radiomap can be obtained based on the plurality of location information representatives. This allows to obtain a radiomap even with respect to environments where no radiomap has been available so far. Obtaining has to be understood that this comprises generating a new radiomap, or updating and/or extending an existing radiomap.

Accordingly, it is possible to obtain a radiomap even in indoor environments.

According to an embodiment of the method according to an aspect of the invention, the method further comprises selecting the plurality of location information representatives of a basic set of location information representatives such that the selected plurality of location information representatives can be associated with a cluster or a region with respect to the basic set of location information representatives.

It may be assumed that there exists a basic set of location information representatives which may have been obtained from measurements of various mobile terminals at different places in different environments, e.g. in different buildings or the like. It is checked whether a plurality of location information representatives of this basic set of location information representatives can be associated with a cluster or a region.

According to an embodiment of the method according to an aspect of the invention, the method further comprises, said cluster or region represents a cluster or region having such a number of location information representatives that a density value depending on the number of location information representatives and a geometric value of said cluster or region exceeds a threshold.

For instance, said cluster or region may represent a cluster or region being associated with such a number of location information representatives that a density value depending on the number of location information representatives and a geometric value of said cluster or region exceeds a threshold.

E.g., said geometric value may represent a two-dimensional area or a three-dimensional space. If there are two or more neighbored clusters or regions each having a density value exceeding the threshold, those neighbored clusters or regions may be combined to a single cluster or single region.

In this way a cluster or region having a high density of location information representatives may be determined based on the basic set of location information representatives and those location information representatives of said cluster or region may selected as a plurality of location information representatives associated with this cluster or region. Thus, it can be assumed that such a selected plurality of location information representatives may be associated with a specific environment, e.g. a building or two or more buildings close to each other or any other large complex.

Then, it may be checked whether a further plurality of location information representatives of the basic set of location information representatives can be associated with a different cluster or different region. If yes, the method may proceed with selecting this plurality of location information representatives of the basic set of location information representatives associated with respective cluster or region. This may be performed in an iterative way until no further clusters or regions can be found in the basic set of location information representatives.

Thus, one or more clusters or regions each having a high density of location information representatives can be detected in the basic set of location information representatives, wherein the location information representatives associated with a respective cluster or region are considered to represent a respective plurality of location information representatives associated with this cluster or region. For instance, each of this at least one plurality of location information representatives may be used as a respective plurality of location information representatives in order to obtain physical layout data of a radiomap based on the respective plurality of location information representatives According to an embodiment of the method according to an aspect of the invention, the method further comprises determining a number of one or more vertical layers, wherein each vertical layer is associated with a set of location information representatives of the plurality of location information representatives.

For instance, this may comprise analyzing the plurality of location information representatives in a vertical domain. As an example, this analyzing may be performed based on altitude information of the location information representatives, wherein this altitude information may represent absolute altitude information and/or relative altitude information. For instance, well-known clustering methods may be applied in order to determine the number of vertical layers of the plurality of location information representatives, wherein each vertical layer may be associated with a different floor of an environment like a building.

If there can be determined no clearly distinguishable vertical layers based on the plurality of location information representatives, the number of vertical layers may be assumed to be one. In this case, there may be only one set of location information representatives which may correspond to the plurality of location information representatives.

According to an embodiment of the method according to an aspect of the invention, the method further comprises, for at least one set of location information representatives of the plurality of location information representatives, obtaining two-dimensional physical layout data based on the respective set of location information representatives.

Accordingly, for each of the at least one vertical layer physical layout data may be obtained based on the respective set of location information representatives of the respective layer. Inherent information of the respective set of location information may be used for obtaining the two-dimensional physical layout data.

As an example, one or more of said physical layout data may be obtained by means of detection algorithms configured to detect a wall, or configured to estimate a shape or form, or configured to estimate a size of a detected floor, room or building.

For instance, said two-dimensional physical layout data may comprise at least one of (i) information descriptive of a location of at least one wall, (ii) information descriptive of a shape and/or form of a floor, a room or a building, and (iii) information descriptive of the size of a floor, a room or a building.

Based on the first set of location information representatives, the size of the building with respect to the vertical layer associated with the first set of location information representatives may be obtained. Estimating the size may be performed in an iterative way by means of selecting an initial size. This initial size may represent a typical size of a building. Then, the method may comprise changing this initial size in order to perform a better match with respect to set of location information representatives of the respective vertical layer. This may be performed in an iterative way. For instance, this may comprise growing or shrinking the size adaptively up until a predefined maximum or minimum size. The estimated size may be used a maximum size of map with respect to the respective vertical layer, and, further, could be also used as a constraint in a positioning phase. Furthermore, the estimated size can be used as maximum size of the radiomap.

For instance, estimating the shape may be performed in an iterative way by means of selecting an initial shape chosen from on a set of shapes based on the set of location information representatives of the respective vertical layer. Then, the method may comprise changing this initial shape at least partly in order to perform a better match with respect to set of location information representatives. This may be performed in an iterative way. For instance, the set of shapes may comprise at least one typical shape of building, room or floor.

According to an embodiment of the method according to an aspect of the invention, the method further comprises estimating a size of building being associated with the plurality of location information representatives, wherein said obtaining two-dimensional physical layout data is based on said estimated size of a building.

According to an embodiment of the method according to an aspect of the invention, said estimating a size of building is based on a-priori information.

Furthermore, as an example, a priori information may be used to obtain the initial size or any other physical layout data.

According to an embodiment of the method according to an aspect of the invention, the method further comprises, said a-priori information is at least one of: (i) at least one satellite image, (ii) at least one street view image, and (iii) at least one street map.

Thus, known a-priori data may be used to support obtaining the physical layout data. For instance, said a-priori data may provide information on outer walls of an environment which might be used for estimating a shape, and/or size or form or other physical layout data.

According to an embodiment of the method according to an aspect of the invention, the method further comprises for at least set of location information representatives of the at least one set of location information representatives: transforming the respective set of location information representatives into a two-dimensional dimension.

For instance, one dimension of the two-dimensional domain may represent the altitude. For instance, this two-dimensional domain may be used to determine the number of vertical layers.

Or, for instance, both dimensions of the two-dimensional domain may be orthogonal with respect to the altitude. Thus, as an example, this two-dimensional domain may be used for a set of location information representatives in order to obtain two-dimensional layout data.

According to an embodiment of the method according to an aspect of the invention, the method further comprises for each of said at least one set of location information representatives, obtaining a map based on the obtained two-dimensional physical layout data associated with the respective set of location information representatives.

This obtaining a map may comprise generating a new map, updating an existing map, or amending an existing map or combining at least two maps into a combined map. For instance, this map represents a part of the radiomap or it may represent the radiomap if there is only one vertical layer.

According to an embodiment of the method according to an aspect of the invention, said map associated with a set of location information representatives represents an indoor floor map.

According to an embodiment of the method according to an aspect of the invention, the method further comprises obtaining further data related to at least one set of location information representatives of the at least one set of location information representative.

As an example, this further data may represent an estimated absolute height of the respective vertical layer or it may represent an estimated relative height of the respective layer with respect to another height, wherein the other height might represent the height of a neighbor vertical layer (e.g. upper or lower vertical layer). Furthermore, this further data may represent the estimated floor height.

According to an embodiment of the method according to an aspect of the invention, the method further comprises, for at least one set of location information representatives of the at least one set of location information representative: (i) estimating an absolute altitude associated with the respective set of location information representatives, and (ii) estimating a height of a floor associated with the respective set of location information representatives.

According to an embodiment of the method according to an aspect of the invention, the method further comprises obtaining a location information of said plurality of location information representatives based on an absolute geolocation representative and at least one relative geolocation representative.

Thus, a location information of a position where no absolute geolocation is available (e.g. indoor) may be obtained. This may be performed for at least one location information representative of the plurality of location information representatives According to an embodiment of the method according to an aspect of the invention, said absolute geolocation representative and said at least one relative geolocation representative are based on measurements performed by a mobile terminal, wherein the method comprises determining the location information representative based on extending an absolute geolocation information depending on the absolute geolocation representative by relative geolocation information depending on at least one of said at least one relative geolocation representative.

For instance, the absolute geolocation representative may be obtained by the mobile terminal at a position where GNSS or another positioning system is available. After obtaining this absolute geolocation representative the mobile terminal may collect at least one relative geolocation representative. For instance, this at least one relative geolocation representative may be obtained or measured by means of a motion sensor, a pressure sensor or any other measurement means providing a signal being indicative of a directional information and/or an altitude information and/or a speed information. Based on this at least one relative geolocation representative it is possible to extend the absolute geolocation corresponding to the absolute geolocation representative with positioning information obtained based on the at least one relative geolocation representative. As an example, a speed information, and/or a directional information, and/or an altitude information may be derived from the at least one relative geolocation representative and be used to extend the absolute geolocation.

Thus, it is possible to radiomap buildings or multilayer constructions with very accurate three-dimensional reference location information even if there is not digital map/floor map of the site at all. For instance, the radiomapping can be done via crowd-sourcing with mobile terminals, which may represent smartphones, having onboard motion sensors to track the terminal's location indoors.

The location information representative of a mobile terminal may thus be estimated for any position based on this extended absolute geolocation.

Said extending an absolute geolocation based on at least one relative geolocation representative may be performed by the mobile terminal and/or by the server, e.g. by means of tracking the position based on the absolute geolocation and the at least one relative geolocation representative.

Furthermore, as an example, a location information representative obtained based on an absolute geolocation representative and at least one relative geolocation representative may be associated with a probability value indicating the reliability of the respective location information representative. For instance, the probability value may depend on a time span between measurement of the absolute geolocation representative and between a measurement of the last relative geolocation representative, wherein the probability value decreases when the time span increases. Furthermore, the probability value may depend on an estimated distance between the position of the absolute geolocation representative and the position of the location information representative obtained based on an absolute geolocation representative and at least one relative geolocation representative, wherein the probability value decreases when the estimated distance increases. Thus, it may be considered whether the obtained location information representative has been obtained by a short tracking procedure based on the absolute geolocation representative, wherein it may be assumed that a short tracking will not introduce a big error in the location estimation, or whether the obtained location representative has been obtained by a long tracking procedure based on the absolute geolocation representative, wherein it may be assumed that a long tracking may introduce a bigger error in the location estimation compared to the short tracking.

Accordingly, it is possible to obtain location information representatives even in an indoor environment, e.g. in buildings where no GNSS measurement is possible. For instance, a certain amount of the plurality of location information representatives may be obtained based on an extension of an absolute geolocation based on at least one relative geolocation representative, e.g., at least 80 percent, 85 percent, 90 percent, 95 percent or all location information representatives of the plurality of location information representatives may have been obtained based on such an extension of an absolute geolocation.

According to an embodiment of the method according to an aspect of the invention, said absolute geolocation representative is determined based on a measurement in a positioning system.

According to an embodiment of the method according to an aspect of the invention, a relative geolocation representative of said at least one relative geolocation representative is determined based on one of: (i) a radiomeasurement, (ii), a measurement of a motion sensor, and (iii) a measurement of pressure sensor.

For instance, said radiomeasurement may represent a measurement in a WiFi-system, or Bluetooth, or Bluetooth Low Energy, or a cellular network, or any other well suited radio-system. The pressure sensor may be used to estimates differences in altitude or to estimate an absolute value of altitude.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

Figure 2A:
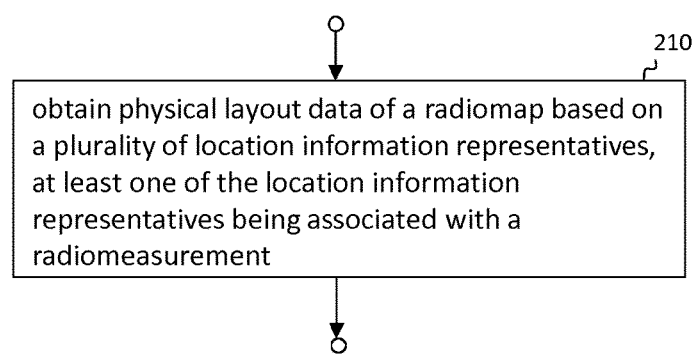
FIG. 2a is a flow chart illustrating a first embodiment of the method according to the an aspect of the invention.
Figure 2B:
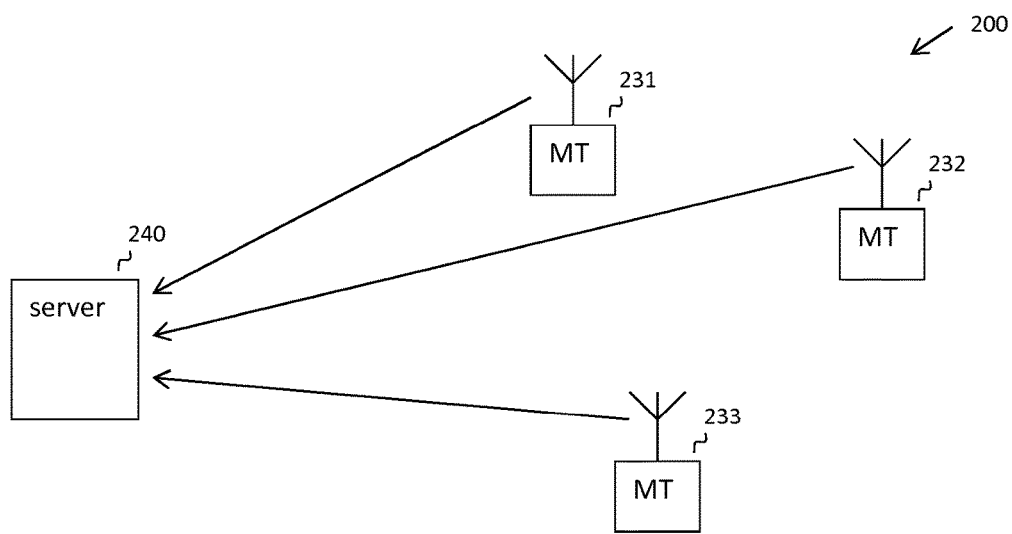
FIG. 2b is a schematic illustration of a system in which example embodiments of the present invention may be employed.
Figure 7:
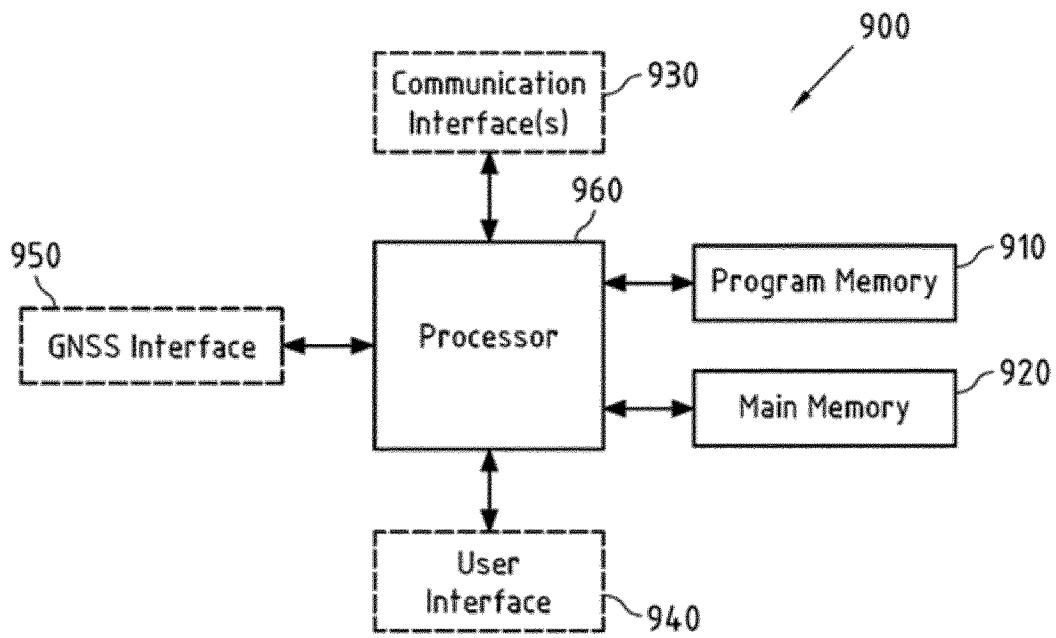
FIG. 7 is a block diagram of an apparatus according to an embodiment of the invention.

FIG. 2a is a flow chart illustrating a first embodiment of the method according to an aspect of the invention. The method actions of the flow chart of FIG. 2 are performed by an apparatus, such as the apparatus that is depicted in FIG. 7 which will be explained later in this specification. FIG. 2b is a schematic illustration of a system 200 in which example embodiments of the present invention may be employed.

Action 210 comprises obtaining physical layout data of a radiomap based on a plurality of location information representatives, wherein at least one of the location information representatives is associated with a radiomeasurement.

For instance, a location information representative may be indicative of an estimated geoposition of a mobile terminal 231, 232, 233. The plurality of location information representatives may be obtained from or based on one or more mobile terminals 231, 232, 233 in an environment, e.g., when moving through the environment. As an example, a plurality of mobile terminals 231, 232, 233 may be used for obtaining the plurality of location information representatives, wherein each of the plurality of mobile terminals 231, 232, 233 may provide at least one location information representative or data which can be used to obtain one or more location information representatives of the plurality of location information representatives.

As an example, a location information representative may be indicative of a position in a two-dimensional or three-dimensional coordinate system. For instance, the radio map may comprise discrete coordinates of a discrete coordinate grid or consist of such coordinates, wherein a location information may be indicative of a position in this coordinate grid.

The location information representative may for instance have been obtained by means of global navigation satellite system (GNSS) interfaces of the mobile terminals 231, 232, 233. The location information representative may specify the location at which a radio measurement value has been measured.

If no GNNS measurement is possible, e.g. in an indoor environment, the location information representative of a mobile terminal 231, 232, 233 may be obtained based on an absolute geolocation representative and at least one relative geolocation representative. For instance, the absolute geolocation representative may be obtained by the mobile terminal 231, 232, 233 at a position where GNSS or another positioning system is available. After obtaining this absolute geolocation representative the mobile terminal may collect at least one relative geolocation representative. For instance, this at least one relative geolocation representative may be obtained or measured by means of a motion sensor, a pressure sensor or any other measurement means providing a signal being indicative of a directional information and/or an altitude information and/or a speed information. Based on this at least one relative geolocation representative it is possible to extend the absolute geolocation corresponding to the absolute geolocation representative with positioning information obtained based on the at least one relative geolocation representative. As an example, a speed information, and/or a directional information, and/or an altitude information may be derived from the at least one relative geolocation representative and be used to extend the absolute geolocation.

For instance, said radiomeasurement may represent a measurement in a WiFi-system, or Bluetooth, or Bluetooth Low Energy, or a cellular network, or any other well suited radio-system. The pressure sensor may be used to estimates differences in altitude or to estimate an absolute value of altitude.

The location information representative of a mobile terminal 231, 232, 233 may thus be estimated for any position based on this extended absolute geolocation.

Said extending an absolute geolocation based on at least one relative geolocation representative may be performed by the mobile terminal 231, 232, 232 and/or by the server 240, e.g. by means of tracking the position based on the absolute geolocation and the at least one relative geolocation representative.

Furthermore, as an example, a location information representative obtained based on an absolute geolocation representative and at least one relative geolocation representative may be associated with a probability value indicating the reliability of the respective location information representative. For instance, the probability value may depend on a time span between measurement of the absolute geolocation representative and between a measurement of the last relative geolocation representative, wherein the probability value decreases when the time span increases. Furthermore, the probability value may depend on an estimated distance between the position of the absolute geolocation representative and the position of the location information representative obtained based on an absolute geolocation representative and at least one relative geolocation representative, wherein the probability value decreases when the estimated distance increases. Thus, it may be considered whether the obtained location information representative has been obtained by a short tracking procedure based on the absolute geolocation representative, wherein it may be assumed that a short tracking will not introduce a big error in the location estimation, or whether the obtained location representative has been obtained by a long tracking procedure based on the absolute geolocation representative, wherein it may be assumed that a long tracking may introduce a bigger error in the location estimation compared to the short tracking.

Accordingly, it is possible to obtain location information representatives even in an indoor environment, e.g. in buildings where no GNSS measurement is possible. For instance, a certain amount of the plurality of location information representatives may be obtained based on an extension of an absolute geolocation based on at least one relative geolocation representative, e.g., at least 80 percent, 85 percent, 90 percent, 95 percent or all location information representatives of the plurality of location information representatives may have been obtained based on such an extension of an absolute geolocation.

At least one of the plurality of location information representatives is associated with a radiomeasurement. Thus, a location information representative may be indicative of a location where the respective mobile terminal 231, 232, 233 performed a radiomeasurement. The location information representative or data which can be used to obtain the location information representative may for instance have been reported by the mobile terminal 231, 232, 233 to a server 240 together with the radio measurement values. As an example, crowdsourced radiomeasurements from a plurality of mobile terminals 231, 232, 233 may be transmitted to the server 140, wherein a radiomeasurement may be transmitted together with a location information representative or data which can be used to obtain the location information representative. Such a radiomeasurement and a location information representative or data which can be used to obtain the location information representative may be considered as a "fingerprint" which is collected by the respective mobile terminal. Thus, a plurality of fingerprints may be collected by different mobile terminals 231, 232, 233 and may be transmitted to the server 240. The estimation of location which serves as basis for a respective location information may be determined at the server 240 or at a mobile terminal 231, 232, 233.

The radio measurement values may for instance contain a received signal strength (RSS), e.g. measured in dBm, for instance with a reference value of 1 mW, with or without the Doppler effect being averaged out therein, and/or pathlosses and/or timing measurement values like timing advance (TA), round-trip time (RTT) and/or propagation delay, and/or an angle of arrival (AOA). Boolean radio measurement values are also possible, e.g. a radio measurement value that indicates whether or not a specific location lies within the coverage area of a specific communication network node.

Figure 2C:
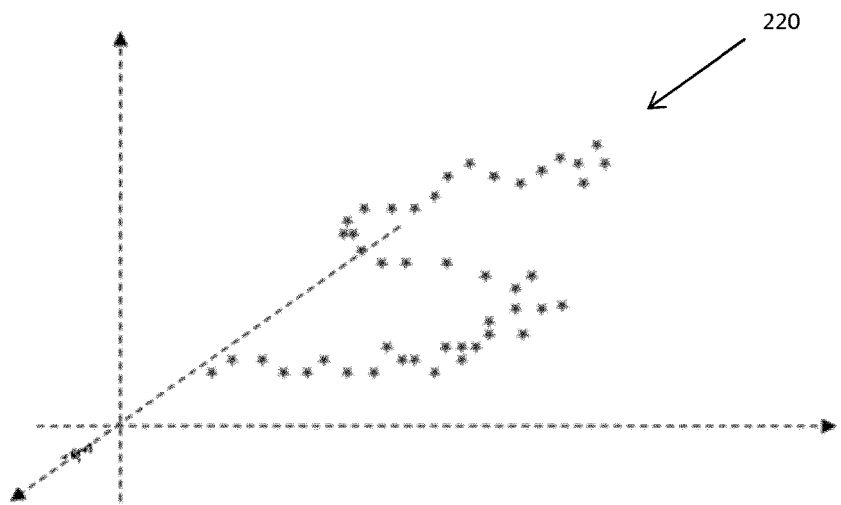
FIG. 2c is a schematic illustration of locations of a plurality of location information representatives.
Figure 3:
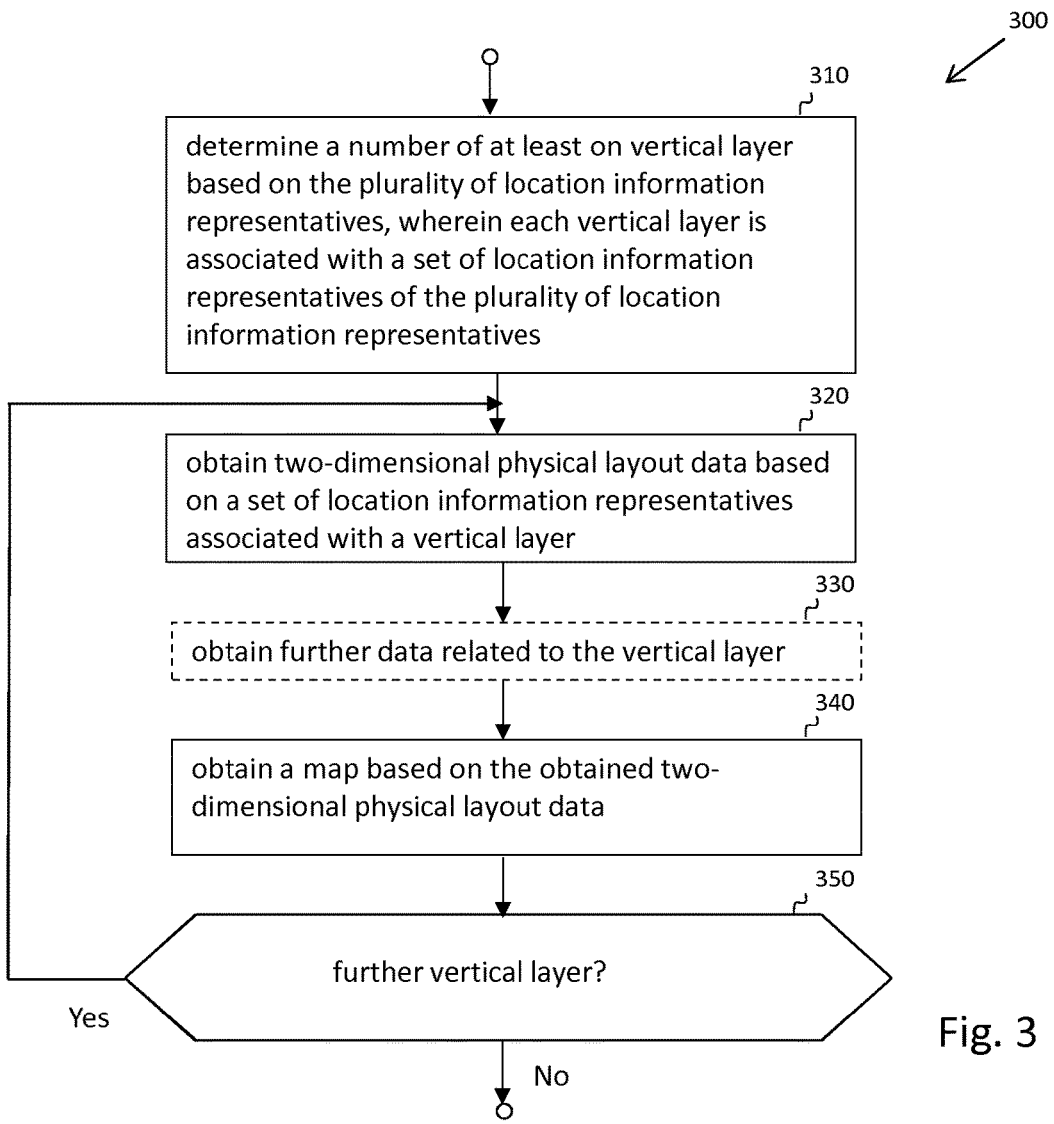
FIG. 3 is a flow chart illustrating a second embodiment of the method according to an aspect of the invention.

As indicted by reference signs 310 in FIG. 3, a radiomap is obtained based on a plurality of location information representatives. FIG. 2c depicts an example of a plurality of location information representatives 220 which have been obtained by means of several mobile terminals 231, 232, 233. Each star depicted in FIG. 2c may represent a position according to a location information representative of the plurality of location information representatives. IN this example, it may be assumed without any limitation that the location information representatives are associated with a three-dimensional coordinate system.

Obtaining a radiomap based on the plurality of location information representatives may comprise obtaining physical layout data of an environment, wherein said obtained physical layout data is used to generate or update a radiomap. This environment may represent an outdoor environment or an indoor environment. For instance, said physical layout data may comprise information being descriptive of an area, a portion of a building, a building, a portion of a floor, a floor, a portion of a room, a room or a group of rooms. Said information being descriptive of a portion of a building, portion of a floor or portion of a room may comprise location information of at least one building wall, and/or location information of at least one door or at least one stair. Said information being descriptive of a building, floor or room may comprise information about the form or size of the building, floor or room. Furthermore, said physical layout data may comprise position information of an area, a portion of a building, a building, a portion of a floor, a floor, a portion of a room, a room or a group of rooms. For instance, said position information may comprise information two-dimensional or three-dimensional location information.

Inherent information about an area, a portion of a building, a building, a portion of a floor, a floor, a portion of a room, a room or a group of rooms or any other physical layout (e.g. physical constraints) in the plurality of location information representatives can be used to obtain said physical layout data. This may be performed by analyzing said plurality of location information representatives by clearly distinguishable features (e.g. altitude) that may allow clustering of the data.

Thus, physical layout data of a radiomap can be obtained based on the plurality of location information representatives. This allows to obtain a radiomap even with respect to environments where no radiomap has been available so far. Obtaining has to be understood that this comprises generating a new radiomap, or updating and/or extending an existing radiomap.

Accordingly, it is possible to obtain a radiomap even in indoor environments.

FIG. 3 is a flow chart illustrating a second embodiment of the method 300 according to an aspect of the invention. The method actions of the flow chart of FIG. 3 are performed by an apparatus, such as the apparatus that is depicted in FIG. 7 which will be explained later in this specification.

Method 300 comprises determining a number of at least one vertical layer based on the plurality of location information representatives, wherein each vertical layer is associated with a set of location information representatives of the plurality of location information representatives, as indicated by reference sign 310 in FIG. 3. For instance, this may comprise analyzing the plurality of location information representatives in a vertical domain. As an example, this analyzing may be performed based on altitude information of the location information representatives, wherein this altitude information may represent absolute altitude information and/or relative altitude information. For instance, well-known clustering methods may be applied in order to determine the number of vertical layers of the plurality of location information representatives, wherein each vertical layer may be associated with a different floor of an environment like a building.

Figure 4:
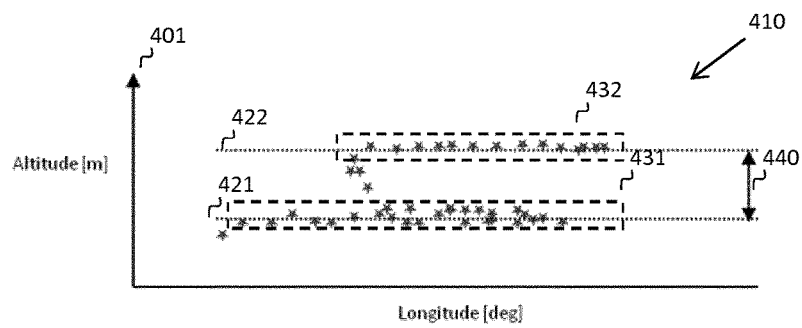
FIG. 4 is a schematic illustration of location information representatives in a two-dimensional view.

FIG. 4 represents as an example the plurality of location information representatives known from FIG. 2c in a two-dimensional view, wherein one dimension 401 represents the altitude. Thus, FIG. 4 shows a view looking at the "side" of environment. For instance, action 310 may comprise transforming the plurality of location information representatives into a two-dimensional domain, wherein one dimension represents the altitude, before the number of at least one vertical layer is determined in action 310.

As can be seen regarding the example in FIG. 4, a first layer 421 may be associated with a first set of location information representatives 431 and a second layer 422 may be associated with a second set of location information representatives 432. Thus, in this example, it may be assumed that the environment comprises two floors, but in reality it is possible that the environment comprises more than two floor, but the method is able to find only two of them because there have been no measurements by mobile terminals in the other floors. Accordingly, the number of vertical layer would be determined to be two in this example. Furthermore, a set of location information representatives 431, 432 can be associated with a respective vertical layer 421, 422. Thus, there may be defined at least one set of location information representatives 431, 432 each being associated with a different vertical layer.

If there can be determined no clearly distinguishable vertical layers based on the plurality of location information representatives in action 310, the number of vertical layers is assumed to be one. In this case, there may be only one set of location information representatives which may correspond to the plurality of location information representatives.

In action 320 depicted in FIG. 3 two-dimensional layout data is obtained based on a set of location information representatives associated with one vertical layer of the one or more vertical layers. For instance, said two-dimensional physical layout data may comprise at least one of (i) information descriptive of a location of at least one wall, (ii) information descriptive of a shape and/or form of a floor, a room or a building, and (iii) information descriptive of the size of a floor, a room or a building.

As an example, one or more of said physical layout data may be obtained by means of detection algorithms configured to detect a wall, or configured to estimate a shape or form, or configured to estimate a size of a detected floor, room or building.

Figure 5:
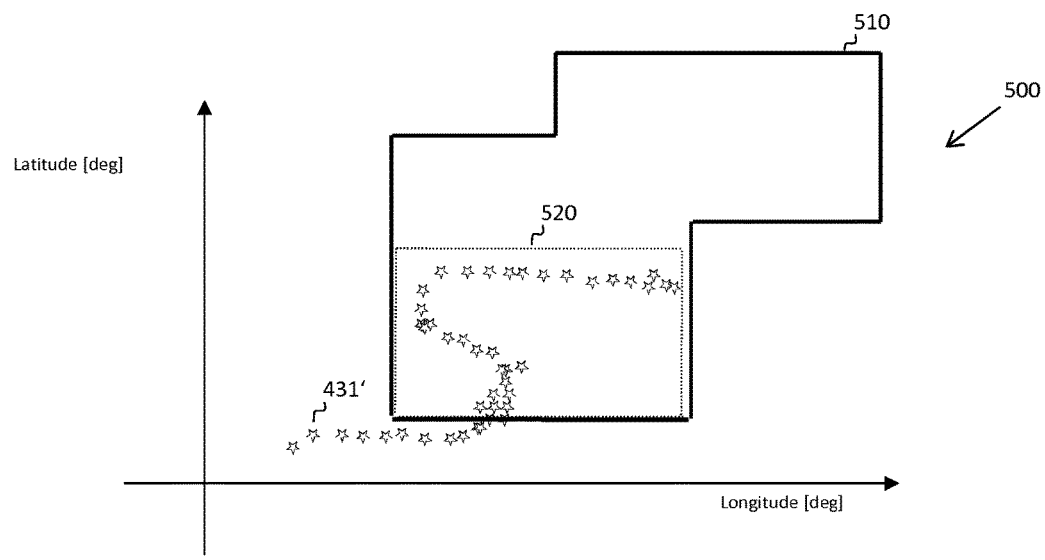
FIG. 5 is a schematic illustration of location information representatives in another a two-dimensional view.

FIG. 5 depicts an example of obtaining two-dimensional layout data with respect to the first vertical layer 421 in FIG. 4, wherein the stars 431' in FIG. 5 correspond to the first set of location information representatives 431 depicted in FIG. 4 but are shown in a kind of "top view". For example, the respective set of location information representatives 431 may be mapped into a two-dimensional domain, wherein both dimensions lie within the selected vertical layer, as exemplarily depicted with respect to the set of location information representatives 431' in FIG. 5.

As an example, boundary 510 may represent the true physical shape and may represent the true physical size of the building in the first vertical layer. Based on the first set of location information representatives, in this example, the size of the building with respect to the vertical layer associated with the first set of location information representatives may be obtained in action 320. As indicated in FIG. 5, this obtained size 520 differs from the true size 510, since there are no location information representatives in the remaining part of the building. Estimating the size may be performed in an iterative way by means of selecting an initial size. This initial size may represent a typical size of a building.

Furthermore, as an example, a priori information may be used to obtain the initial size. Said a priori information may be at least one of: (i) at least one satellite image, (ii) at least one street view image; and (iii) at least one street map or any other well-suited and available a priori information.

Then, the method may comprise changing this initial size in order to perform a better match with respect to set of location information representatives of the respective vertical layer. This may be performed in an iterative way. For instance, this may comprise growing or shrinking the size adaptively up until a predefined maximum or minimum size. The estimated size may be used a maximum size of map with respect to the respective vertical layer, and, further, could be also used as a constraint in a positioning phase.

Estimating the shape may be performed in an iterative way by means of selecting an initial shape chosen from on a set of shapes based on the set of location information representatives of the respective vertical layer. Then, the method may comprise changing this initial shape at least partly in order to perform a better match with respect to set of location information representatives. This may be performed in an iterative way. For instance, the set of shapes may comprise at least one typical shape of building, room or floor.

Furthermore, as an example, a priori information may be used to obtain the shape and or information descriptive of allocation of at least one wall. Said a priori information may be at least one of: (i) at least one satellite image, (ii) at least one street view image; and (iii) at least one street map or any other well-suited and available a priori information.

For instance, further data related to the vertical layer may be obtained in optional action 330. As an example, this further data may represent an estimated absolute height of the respective vertical layer or it may represent an estimated relative height of the respective layer with respect to another height, wherein the other height might represent the height of a neighbor vertical layer (e.g. upper or lower vertical layer). Furthermore, this further data may represent the estimated floor height.

Furthermore, location information representatives may be associated with a probability value indicating the reliability of the respective location information representative. If there is a probability value with respect to a location information representative of a set of location information representatives, this may be taken into account when obtaining physical layout data. For instance, a location information representative being associated with a probability value below a predefined threshold might be discarded or might be considered less compared to a location information representative being associated with a probability value exceeding this predefined threshold.

In action 340, a map associated with the respective vertical layer is obtained based on two-dimensional physical layout obtained in action 320. This obtaining a map may comprise generating a new map, updating an existing map, or amending an existing map or combining at least two maps into a combined map. Accordingly, this map represents a part of the radiomap obtained in action 210 or it may represent the radiomap obtained in action 210 if there is only one vertical layer.

In action 350 it may be checked whether there is a further vertical layer for which a map should be obtained. If yes, method 300 may go back to action 320 with obtaining two-dimensional data physical layout data based on the set of location information representatives associated with the further vertical layer.

In this way, a multilayer radiomap may be obtained based on the plurality of location information representatives.

Figure 6:
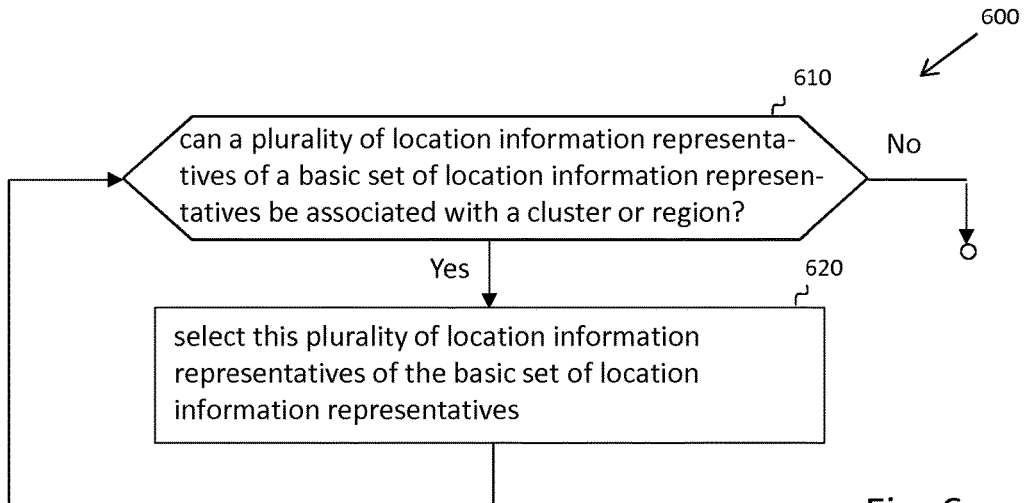
FIG. 6 is a flow chart illustrating a third embodiment of the method according to the an aspect of the invention.

FIG. 6 is a flow chart illustrating a third embodiment of the method 600 according to an aspect of the invention. The method actions of the flow chart of FIG. 6 are performed by an apparatus, such as the apparatus that is depicted in FIG. 7 which will be explained later in this specification.

Method 600 may be used to select the plurality of location information representatives 220 serving as basis for any of the preceding embodiments. It may be assumed that there exists a basic set of location information representatives which may have been obtained from measurements of various mobile terminals at different places in different environment, e.g. in different buildings or the like.

In a action 610 it is checked whether a plurality of location information representatives of this basic set of location information representatives can be associated with a cluster or a region.

For instance, said cluster or region may represent a cluster or region being associated with such a number of location information representatives that a density value depending on the number of location information representatives and a geometric value of said cluster or region exceeds a threshold.

E.g., said geometric value may represent a two-dimensional area or a three-dimensional space. If there are two or more neighbored clusters or regions each having a density value exceeding the threshold, those neighbored clusters or regions may be combined to a single cluster or single region.

In this way a cluster or region having a high density of location information representatives may be determined based on the basic set of location information representatives and those location information representatives of said cluster or region may selected as a plurality of location information representatives associated with this cluster or region (action 620). Thus, it can be assumed that such a selected plurality of location information representatives may be associated with a specific environment, e.g. a building or two or more buildings close to each other or any other large complex.

Then, in action 620 it may be checked whether a further plurality of location information representatives of the basic set of location information representatives can be associated with a different cluster or different region. If yes, the method 600 proceeds with selecting this plurality of location information representatives of the basic set of location information representatives associated with respective cluster or region (action 620).

Thus, one or more clusters or regions each having a high density of location information representatives can be detected in the basic set of location information representatives based on the method 600, wherein the location information representatives associated with a respective cluster or region are considered to represent a respective plurality of location information representatives associated with this cluster or region. For instance, each of this at least one plurality of location information representatives may be used as a respective plurality of location information representatives for any of the preceding methods.

FIG. 7 shows a block diagram of an apparatus 900 according to an embodiment of the invention. The apparatus 900 may represent an embodiment of the first or second apparatus according to an aspect of the invention or an embodiment of the first or second apparatus according to the second aspect of the invention.

Apparatus 900 may for instance be or form a part (e.g. as a module) of a mobile terminal, e.g. mobile terminal 213, 232, 233 of FIG. 2*b*, or of a server, e.g. server 240 of FIG. 2*b*. Non-limiting examples of a mobile terminal are a cellular phone, a personal digital assistant, a laptop computer, a tablet computer or a multimedia player.

Apparatus 900 comprises a processor 960. Processor 960 may represent a single processor or two or more processors, which are for instance at least partially coupled, for instance via a bus. Processor 960 executes a program code stored in program memory 910 (for instance program code causing apparatus 900 to perform one or more of the embodiments of a method according to the invention (as for instance further described above with reference to the flow charts of FIGS. 2, 3, 4, 4*a* and 12), when executed on processor 960), and interfaces with a main memory 920. Some or all of memories 910 and 920 may also be included into processor 960. One of or both of memories 910 and 920 may be fixedly connected to processor 960 or at least partially removable from processor 960, for instance in the form of a memory card or stick. Program memory 910 may for instance be a non-volatile memory. Examples of such tangible storage media will be presented with respect to FIG. 8 below. It may for instance be a FLASH memory (or a part thereof), any of a ROM, PROM, EPROM and EEPROM memory (or a part thereof) or a hard disc (or a part thereof), to name but a few examples. Program memory 910 may also comprise an operating system for processor 960. Program memory 910 may for instance comprise a first memory portion that is fixedly installed in apparatus 900, and a second memory portion that is removable from apparatus 900, for instance in the form of a removable SD memory card. One or more RMDSs that are processed or generated by apparatus 900 when executing one of the methods of the present invention may for instance be stored in program memory 910. Main memory 920 may for instance be a volatile memory. It may for instance be a RAM or DRAM memory, to give but a few non-limiting examples. It may for instance be used as a working memory for processor 960 when executing an operating system and/or programs.

Processor 960 may further control a communication interface 930 (or several communication interfaces) configured to receive and transmit radio signals. As communication interface 930 is an optional component of apparatus 900, it is shown with dashed outlines.

For instance, if the apparatus 900 forms part of mobile terminal 231, 232, 233 of FIG. 2b, communication interface 930 may be configured to identify communication nodes. It may in this case also be used to measure radio parameters based on signals received from nodes, i.e. to obtain actual radio measurement values, and/or to exchange information with server 240 of system 200 or with other mobile terminals. The communication interface may in particular serve for transmitting radio measurement values and node identification information from the mobile terminal 231, 232, 233 to the server 240 if a position of the mobile terminal 120 is to be determined by the server 140. If position estimation is performed at the mobile terminal 231, 232, 233, the mobile terminal 120 may use the communication interface 930 for receiving a frequency transformed (or reconstructed) radiomap data set (RMDS) from server 120.

Figure 1:
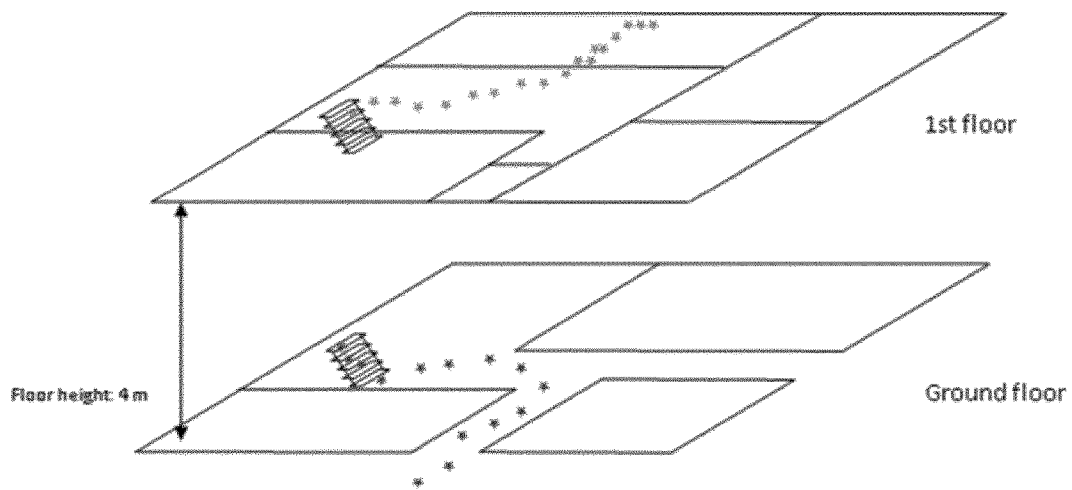
FIG. 1 is a schematic illustration of a radiomap.

If the apparatus is for instance part of the server 140 of FIG. 1, the communication interface 930 may inter alia serve for receiving radio measurement values and for transmitting a position estimate or a frequency transformed (or reconstructed) RMDS.

Communication interface 930 may for instance be a wireless communication interface. Communication interface 930 may thus for instance comprise circuitry such as modulators, filters, mixers, switches and/or one or more antennas to allow transmission and/or reception of signals. Communication interface 930 may for instance be configured to allow communication in a 2G/3G/4G cellular communication network and/or a non-cellular communication network, such as for instance a WLAN network. Nevertheless, communication interface 930 may also provide wire-bound communication capabilities.

Processor 960 may further control an optional user interface 940 configured to present information to a user of apparatus 900 and/or to receive information from such a user.

If the apparatus for instance forms part of a mobile terminal, e.g. mobile terminal 120 of FIG. 1, user interface may for instance present a position estimate to the user of the mobile terminal. User interface 940 may for instance be the standard user interface via which a user of apparatus 900 controls the functionality thereof, such as making phone calls, browsing the Internet, etc.

Processor 20 may further control an optional GNSS interface 950 configured to receive positioning information of an GNSS. A GNSS interface may in particular be provided if apparatus 900 forms part of a mobile terminal, e.g. mobile terminal 231, 232, 233 of FIG. 2b. It should be noted that, even in case apparatus 900 has a GNSS interface 950, the user of apparatus 900 (or the mobile terminal comprising apparatus 900) can still benefit from using RMDS-based positioning technologies, since these technologies may allow for significantly reduced time-to-first-fix and/or lower power consumption as compared to GNSS-based positioning. Also, and perhaps even more important, RMDS-based positioning technologies work indoors, which is generally a challenging environment for GNSS-based technologies. If optional communication interface 930 and optional GNSS interface 950 both are provided in apparatus 900, apparatus 900 may be used to obtain fingerprints, i.e. triples of actual radio measurement values, node identification information and location information, and make them available for positioning purposes.

The components 910-950 of apparatus 900 may for instance be connected with processor 960 by means of one or more serial and/or parallel busses.

It is to be noted that the circuitry formed by the components of apparatus 900 may be implemented in hardware alone, partially in hardware and in software, or in software only, as further described at the end of this specification.

A action performed by apparatus 900 may preferably be understood such that corresponding program code is stored in memory 910 and that the program code and the memory are configured to, with processor 960, cause apparatus 900 to perform the action. Equally well, a action performed by apparatus 900 may preferably be understood such that apparatus 900 comprises according means for performing this action. For instance, processor 960 together with memory 910 and the program code stored there and together with memory 920 may be considered as means for applying a discrete frequency transform to an original RMDS and thus as means for obtaining a frequency transformed RMDS by doing so if the program code stored in memory 910 is selected accordingly. Likewise, processor 960 together with memory 910 and the program code stored there and together with memory 920 may be considered as means for applying an inverse discrete frequency transform to a frequency transformed RMDS and thus as means for obtaining a reconstructed RMDS by doing so if the program code stored in memory 910 is selected accordingly.

When apparatus 900 performs a method according to the first or second aspect of the invention (e.g. a method a further described above with reference to the flow charts of FIGS. 2, 3, 4, 4a and 12) the apparatus may thus be considered as an embodiment of the first or second apparatus according to an aspect of the invention or as an embodiment of the first or second apparatus according to the second aspect of the invention, respectively. Likewise, the program memory 910 of apparatus 900, which may in particular be a non-transitory storage medium, may be considered as an embodiment of a tangible storage medium according to the first or the second aspect of the invention if corresponding computer program code (for instance a set of instructions) is stored therein.

Figure 8:
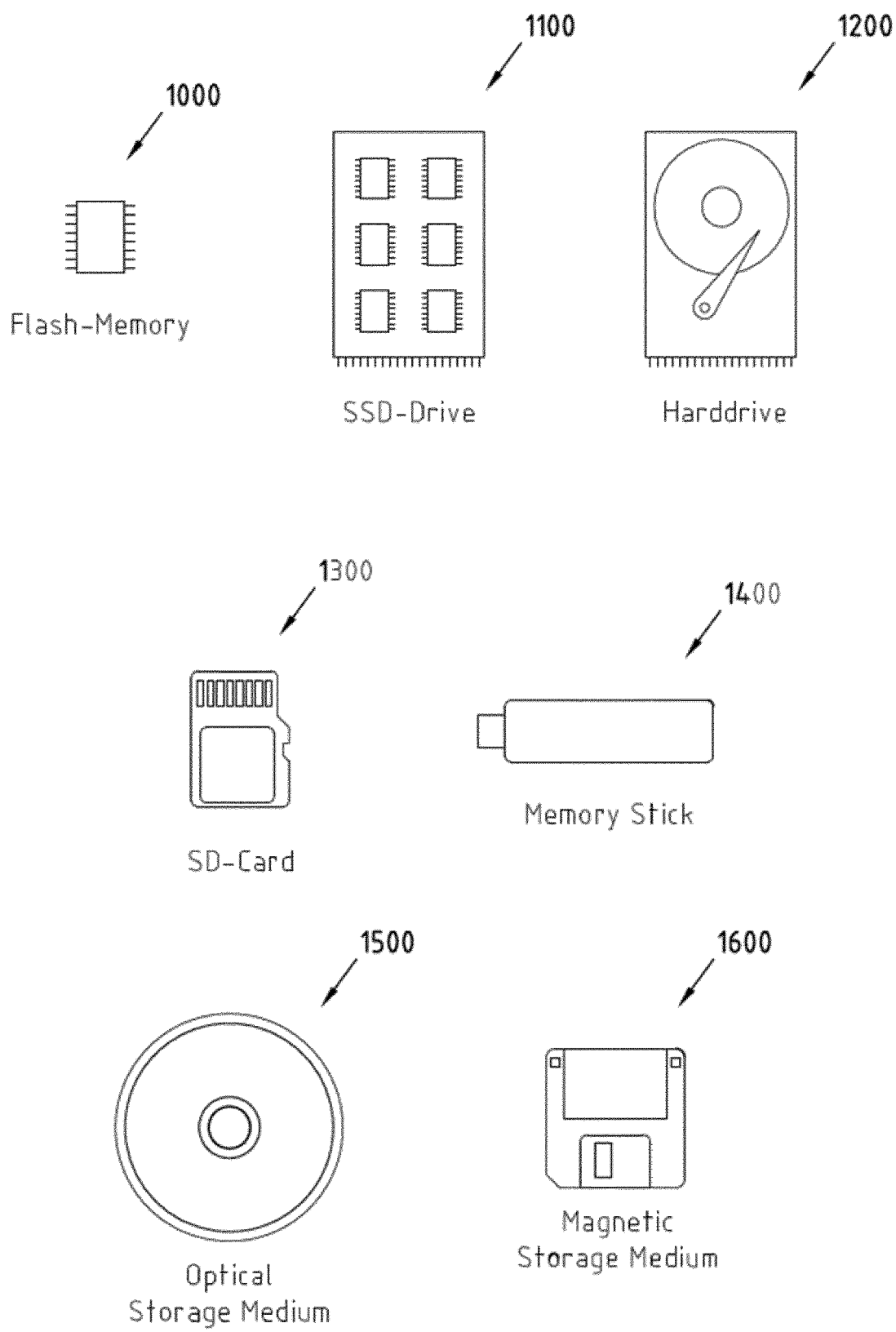
FIG. 8 is a schematic illustration of examples of tangible storage media according to the present invention.

FIG. 8 schematically illustrates examples of tangible storage media according to the present invention that may for instance be used to implement program memory 910 of FIG. 7. To this end, FIG. 8 displays a flash memory 1000, which may for instance be soldered or bonded to a printed circuit board, a solid-state drive 1100 comprising a plurality of memory chips (e.g. Flash memory chips), a magnetic hard drive 1200, a Secure Digital (SD) card 1300, a Universal Serial Bus (USB) memory stick 1400, an optical storage medium 1500 (such as for instance a CD-ROM or DVD) and a magnetic storage medium 1600.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 960 of FIG. 7, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. An apparatus comprising at least one processor and at least one memory including computer program code, the at least one memory and the computer program code configured to, with the at least one processor, cause the apparatus at least to perform:

obtaining physical layout data of a radiomap based on a plurality of location information representatives, wherein at least one of the location information representatives is associated with a radiomeasurement and a probability value indicative of a reliability of the at least one of the location information representatives, and wherein the probability value is dependent on at least an estimated distance between a first location information representative associated with a radiomeasurement and a second location information representative associated with a radiomeasurement that was measured subsequent to the radiomeasurement associated with the first location information representative; and generating, updating or extending a map based on the obtained physical layout data associated with the plurality of location information representatives.

2. The apparatus according to claim 1, wherein the at least one memory and the computer program code are configured to, with the at least one processor, cause the apparatus to perform selecting the plurality of location information representatives of a basic set of location information representatives such that the selected plurality of location information representatives can be associated with a cluster or a region with respect to the basic set of location information representatives.

3. The apparatus according to claim 2, wherein said cluster or region represents a cluster or region having such a number of location information representatives that a density value depending on the number of location information representatives and a geometric value of said cluster or region exceeds a threshold.

4. The apparatus according to claim 1, wherein the at least one memory and the computer program code are configured to, with the at least one processor, cause the apparatus to perform determining a number of one or more vertical layers, wherein each vertical layer is associated with a set of location information representatives of the plurality of location information representatives.

5. The apparatus according to claim 1, wherein the at least one memory and the computer program code are configured to, with the at least one processor, cause the apparatus to perform, for at least one set of location information representatives of the plurality of location information representatives, obtaining two-dimensional physical layout data based on the respective set of location information representatives.

6. The apparatus according to claim 5, wherein said two-dimensional physical layout data comprises at least one of:

information descriptive of a location of at least one wall;
information descriptive of a shape and/or form of a floor, a room or a building; and
information descriptive of the size of a floor, a room or a building.

7. The apparatus according to claim 5, wherein the at least one memory and the computer program code are configured to, with the at least one processor, cause the apparatus to perform estimating a size of building being associated with the plurality of location information representatives, wherein said obtaining two-dimensional physical layout data is based on said estimated size of a building.

8. The apparatus according to claim 7, wherein said estimating a size of building is based on a-priori information.

9. The apparatus according to claim 8, wherein said a-priori information is at least one of:

at least one satellite image;
at least one street view image; and
at least one street map.

10. The apparatus according to claim 5, wherein the at least one memory and the computer program code are configured to, with the at least one processor, cause the apparatus to perform, for at least one set of location information representatives of the at least one set of location information representatives:

transforming the respective set of location information representatives into a two-dimensional dimension.

11. The apparatus according to claim 5, wherein the at least one memory and the computer program code are configured to, with the at least one processor, cause the apparatus to generate, update or extend a map by obtaining the map, for each of said at least one set of location information representatives, based on the obtained two-dimensional physical layout data associated with the respective set of location information representatives.

12. The apparatus according to claim 11, wherein said map associated with a set of location information representatives represents an indoor floor map.

13. The apparatus according to claim 4, wherein the at least one memory and the computer program code are configured to, with the at least one processor, cause the apparatus to perform obtaining further data related to at least one set of location information representatives of the at least one set of location information representative.

14. The apparatus according to claim 13, wherein the at least one memory and the computer program code are configured to, with the at least one processor, cause the apparatus to perform, for at least one set of location information representatives of the at least one set of location information representative:
    determining an absolute altitude associated with the respective set of location information representatives; and
    estimating a height of a floor associated with the respective set of location information representatives.

15. The apparatus according to claim 1, wherein the at least one memory and the computer program code are configured to, with the at least one processor, cause the apparatus to perform obtaining at least one location information representative of the plurality of location information representatives based on at least one absolute geolocation representative and at least one relative geolocation representative.

16. The apparatus according to claim 15, wherein the at least one memory and the computer program code are configured to, with the at least one processor, cause the apparatus to perform obtaining a location information of said plurality of location information representatives based on an absolute geolocation representative and at least one relative geolocation representative.

17. The apparatus according to claim 16, wherein said absolute geolocation representative and said at least one relative geolocation representative are based on measurements performed by a mobile terminal, said apparatus is caused to determine the location information representative based on extending an absolute geolocation information depending on the absolute geolocation representative by relative geolocation information depending on at least one of said at least one relative geolocation representative.

18. The apparatus according to claim 17, wherein said absolute geolocation representative is determined based on a measurement in a positioning system.

19. The apparatus according to claim 17, wherein a relative geolocation representative of said at least one relative geolocation representative is determined based on one of:
    radiomeasurement
    measurement of a motion sensor; and
    measurement of pressure sensor.

20. A method comprising:
    obtaining physical layout data of a radiomap based on a plurality of location information representatives, wherein at least one of the location information representatives is associated with a radiomeasurement and a probability value indicative of a reliability of the at least one of the location information representatives, and wherein the probability value is dependent on at least an estimated distance between a first location information representative associated with a radiomeasurement and a second location information representative associated with a radiomeasurement that was measured subsequent to the radiomeasurement associated with the first location information representative; and
    generating, updating or extending a map based on the obtained physical layout data associated with the plurality of location information representatives.

21. A computer readable storage medium encoded with instructions that, when executed by a computer, perform:
    obtaining physical layout data of a radiomap based on a plurality of location information representatives, wherein at least one of the location information representatives is associated with a radiomeasurement and a probability value indicative of a reliability of the at least one of the location information representatives, and wherein the probability value is dependent on at least an estimated distance between a first location information representative associated with a radiomeasurement and a second location information representative associated with a radiomeasurement that was measured subsequent to the radiomeasurement associated with the first location information representative; and
    generating, updating or extending a map based on the obtained physical layout data associated with the plurality of location information representatives.

* * * * *